US006954978B1

(12) United States Patent
Crowder et al.

(10) Patent No.: US 6,954,978 B1
(45) Date of Patent: Oct. 18, 2005

(54) METHOD FOR REDUCING CORROSION OF A HEAD ELEMENT DURING THE MANUFACTURE OF A DISK DRIVE

(75) Inventors: Mark S. Crowder, Broomfield, CO (US); Richard E. Rupp, Jr., Berthoud, CO (US); Robert Turner, Thornton, CO (US); Meherab Amaria, Broomfield, CO (US)

(73) Assignee: Maxtor Corporation, Longmont, CO (US)

( * ) Notice: Subject to any disclaimer, the term of this patent is extended or adjusted under 35 U.S.C. 154(b) by 298 days.

(21) Appl. No.: 09/975,642

(22) Filed: Oct. 10, 2001

Related U.S. Application Data

(60) Provisional application No. 60/239,158, filed on Oct. 10, 2000.

(51) Int. Cl.[7] .......................... G11B 5/127; H04R 31/00
(52) U.S. Cl. ............................ 29/603.03; 29/603.02; 29/603.07; 29/603.13; 29/885; 29/426; 156/247; 156/289; 156/344; 427/154; 427/155; 427/129; 427/130; 428/421
(58) Field of Search .................... 29/603.02, 603.03, 29/603.07, 603.13, 885, 426.2, 426; 427/129, 427/130, 154, 155; 156/247, 289, 344; 428/421

(56) References Cited

U.S. PATENT DOCUMENTS

| 4,716,483 A | * | 12/1987 | Walsh | 360/264.2 |
|---|---|---|---|---|
| 4,775,586 A | * | 10/1988 | Bohrn et al. | 428/324 |
| 5,969,906 A | * | 10/1999 | Arya et al. | 360/245 |
| 6,416,935 B1 | * | 7/2002 | Hsiao et al. | 430/320 |
| 6,532,134 B1 | * | 3/2003 | Chen et al. | 360/235.2 |

FOREIGN PATENT DOCUMENTS

| JP | 56049530 A | * | 5/1981 | H01L 21/312 |
|---|---|---|---|---|
| JP | 02076108 A | * | 3/1990 | G11B 5/127 |

OTHER PUBLICATIONS

"An integrated manufacturing data management system"; Beach, M.J.; Jones, A.C.; Electronic Manufacturing Technology Symposium, 1990; Oct. 1-3, 1990; pp.: 306-311.*
U.S. Appl. No. 10/410,392, filed Apr. 8, 2003, Crowder.

* cited by examiner

*Primary Examiner*—Paul Kim
(74) *Attorney, Agent, or Firm*—Sheridan Ross P.C.

(57) ABSTRACT

A method is provided for protecting a head element of a computer disk drive during rework operations by applying thioropolymeric protective coating or film to the head element after the disk drive has been opened. Application of the protective coating is preferably performed utilizing a solvent-mediated deposition process. Further aspects of the invention include the application of the protective coating to the head element prior to storage of the head element or prior to shipping the head element in order to facilitate rework of the head element or other components of the disassembled disk drive.

69 Claims, 3 Drawing Sheets

METHOD FOR REDUCING CORROSION OF A HEAD ELEMENT DURING THE MANUFACTURE OF A DISK DRIVE

RELATED APPLICATIONS

The present application claims priority under 35 U.S.C. § 119(e) from U.S. Provisional Patent Application Ser. No. 60/239,158 filed Oct. 10, 2000, which provisional application is incorporated herein by reference in its entirety.

FIELD OF THE INVENTION

The present invention relates to methods of protecting magnetic recording heads. More particularly, the present invention relates to methods of protecting magnetic recording heads during assembly and rework processes.

BACKGROUND OF THE INVENTION

Magnetic hard disk drives are useful devices for storing significant amounts of data and quickly accessing that data. Data is read from a hard disk by an electro-magnetic process in which magnetic domains resident in the disk are converted into electrical signals by a magnetic head or transducer positioned above the surface of a disk as the disk rapidly rotates about an axis. Similarly, data is written to a disk by the same or a different head or transducer which converts electrical signals into a magnetic field which magnetizes discrete locations of the data layer of the magnetic disk. Generally speaking, reversing the direction of the magnetic field produced by the transducer reverses the polarity of the magnetic domain of the disk.

In a conventional hard disk drive, the transducer or transducers for reading and writing data are positioned at the rear end of a slider which either rides in contact with the surface of the disk or flies above, but in close proximity to, the surface of the disk. The slider is connected to a load beam which, in turn, is connected to an actuator arm. The actuator arm pivots about a shaft under the influence of a voice coil motor in order to position the transducer, or read/write element, relative to the tracks of data resident on the disk. The local beam typically biases the transducer to a position in contact with the surface of the disk when the disk drive is turned off.

Transducers are delicate structures and are susceptible to corrosion. As a result, during the assembly process, a protective overcoat is applied to heads and sliders. The overcoat protects the slider from corrosion before final assembly while the head is exposed to the atmosphere. When assembly is completed, the actuator assemblies and disks are contained in a sealed housing which reduces or substantially eliminates the likelihood of corrosion of the transducers. Various filter elements are contained in the disk housing to maintain the relative purity of that environment.

Once the drive is fully assembled, it is subjected to numerous tests for purposes of quality control, and perhaps calibration. As part of these procedures, the drive is started and stopped numerous times, causing the slider to slide across the disk surface and the protective overcoat to be worn away. With the overcoat removed from the transducer(s), read and write operations can also be tested. Assuming all tests are successful, the drive is packaged and sold.

In those instances when the drive fails one or more tests, the problems may be addressed by reworking or repairing the drive. The rework process requires access to the drive and may result in exposure of the drive components to the atmosphere or other corrosive elements. The disassembly and rework process may also expose the unprotected transducers or magnetic elements of the heads to corrosion from exposure to the atmosphere. If the exposure to corrosive environmental elements is not minimized, the expected life and future operation of the disk drive will likely be adversely affected to the chagrin of the customer and manufacturer.

SUMMARY OF THE INVENTION

The invention involves the use of a protective coating or film that is applied to the head element, or transducer, of a disk drive for the purpose of protecting the head element from corrosion. The heads of a disk drive are typically overcoated with a carbon film during their original manufacture to protect the read/write elements from corrosion. However, for whatever reason, the head element may be susceptible to corrosion and in this case the coating of this invention can be applied to protect the head element from corrosion. A specific case were the head(s) are susceptible to corrosion is reworking a disk drive or a head stack assembly (HSA). To rework a disk drive the top cover is removed. HSAs may be reworked prior to installation in a drive. The disk drive or HSA may have subsequently undergone testing or use, thereby at least partially or fully removing the original protective coating. The head element of the slider is the location of the sensitive thin metal layers or films which conduct read/write operations and which are subject to corrosion from exposure to the ambient environment.

Disk drives that have been identified as requiring rework for any number of reasons must be opened to access the contents of the disk drive. Upon opening the disk drive, the head element will be exposed to the atmosphere and associated corrosive materials, such as water and corrosive compounds containing sulfur or chlorine that may exist in the local atmosphere. In the case of HSAs that have not been installed, no removal from a device is required. To reduce the corrosion of the head element during rework of the disk drive or HSA, a protective coating can be applied to the slider and head element, thereby providing a new protective coating to the areas of the head element that will have been stripped of the original protective coating during the preliminary testing or use of the disk drive.

By providing a protective coating to the head element during the reworking process, the head element is protected from corrosion, and cost savings are realized in the form of conserved parts, i.e., not having to replace the head element. In addition, future repairs are reduced and extended life is achieved because the heads have been protected from corrosion. Accordingly, cost savings are realized in the form of reduced future repair costs that would be associated with both parts and labor, or premature replacement of the drive. Finally, the potential exists for degraded head performance due to head corrosion from exposure to the atmosphere. By applying a protective coating to the head after disassembling the disk drive, the possibility of sub-optimal performance due to the presence of corrosion on the head element is greatly reduced, if not eliminated.

The protective coating is preferably a thin fluorocarbon polymeric coating. One example is the polymer found in the FC722 solution, produced by 3M®, although the present invention is not limited to this material. Any thickness of coating is preferable over no coating and, therefore, the present invention is not intended to be limited to a specific range of thicknesses. However, good results have been achieved with a fluorocarbon polymeric coating having a thickness of approximately 250 angstroms, although a thin layer such as a monolayer (a layer having a thickness of one molecule) can provide some level of corrosion protection. As used herein, a thick layer is intended to mean greater than 50 angstroms and a thin layer is intended to mean less than 20 angstroms.

The protective coating is preferably deposited on the head element and the slider using a solvent-mediated deposition process such as spraying, dipping and draining processes. However, other thin film deposition processes are possible, such as a vapor-mediated process. Precursor molecules in the vapor phase may also be deposited by exposing the head element and slider to precursor gases and excitation such as by heat, ultraviolet, infrared, or plasma energy to form the protective coating. Alternatively, vacuum processes can be used to apply the protective polymer coating.

Cleaning of the head element can be optionally performed before the protective coating is applied. This cleaning will help remove debris that is attached to the head stack assembly. Otherwise, the coating process may trap debris on the head stack assembly.

For optimum corrosion protection, the coating should be applied as thick as possible, preferably greater than 50 angstroms. Because corrosion is proportioned to the permeability of the protective coating, a thicker coating is preferred for longer protection. Nevertheless, it should be understood that different compositions have different permeabilities and, therefore, different coatings of the same thickness may have different permeabilities. Moreover, increased corrosion protection may also be obtained by post-processing of the polymeric film protective coating. By exposing the deposited film to infrared, ultraviolet, plasma, or other forms of energy that cause the polymer to cross-link and remove water, thereby providing increased corrosion protection.

As previously stated, the protective coating should be applied as thick as possible for optimum corrosion protection. However, it may advantageous to remove the protective polymer film or reduce the thickness of the film prior to installing the head into the disk drive. The inventors have determined that solvent cleaning processes can be used to remove all of the protective polymer film or remove all but approximately less than 20 angstroms of the protective coating. Cleaning the protective polymer coated head with a solvent cleaning process using a non-polar solvent (for example, hydrofluoroethers) can produce a head with the thin film remaining on the head. Moreover, and as an additional benefit of this invention, the remaining thin layer of a fluorocarbon protective coating will act to reduce the surface energy of the slider, thereby also inhibiting chemicals and debris from sticking to the slider.

The protective coating can also be used to protect heads that are being stored and/or shipped and are awaiting assembly into a disk drive, or are for some other reason not installed in the protective environment of a closed disk drive housing.

In summary, a typical disk drive includes a housing, a platter of disks for the storage of information, actuator arm assemblies with read/write head elements located at the distal end, and some means for transmitting information from the computer processor to the head, such as a ribbon or flux circuit. When re-opened for purposes of performing rework, the invention consists of a layer of protective coating applied to the head element, thereby substantially reducing corrosion of the sensitive head read/write surfaces during the period of rework. In addition, utilization of a layer of protective coating to reduce corrosion is applicable in subcombination to a disk drive head element, where the head element is separated from the other disk drive components.

The invention disclosed herein further comprises a method of reducing corrosion of a disk drive head element by applying a protective coating to the head element after opening the disk drive housing and removing the head element from the disk drive housing. In addition, a method of protecting a disk drive head element from corrosion during shipping is disclosed, whereby the method comprises applying the protective coating to a new head element, or in the case of a previously assembled disk drive, removing the head element from the disk drive and applying a protective coating, placing the head element into a container and transporting the container. Finally, a method of protecting a disk drive head element from corrosion during storage is disclosed, whereby the method comprises of the steps of removing the head element from the disk drive, applying the protective coating and placing the head element into a storage container.

While the following disclosure describes the invention in connection with one embodiment, one should understand that the invention is not limited to this embodiment. Furthermore, one should understand that the drawings are not to scale and that graphic symbols, diagrammatic representatives, and fragmentary views, in part, may illustrate the embodiment. In certain instances, the disclosure may not include details which are not necessary for an understanding of the present invention such as conventional details of fabrication and assembly.

DETAILED DESCRIPTION

Figure 1:
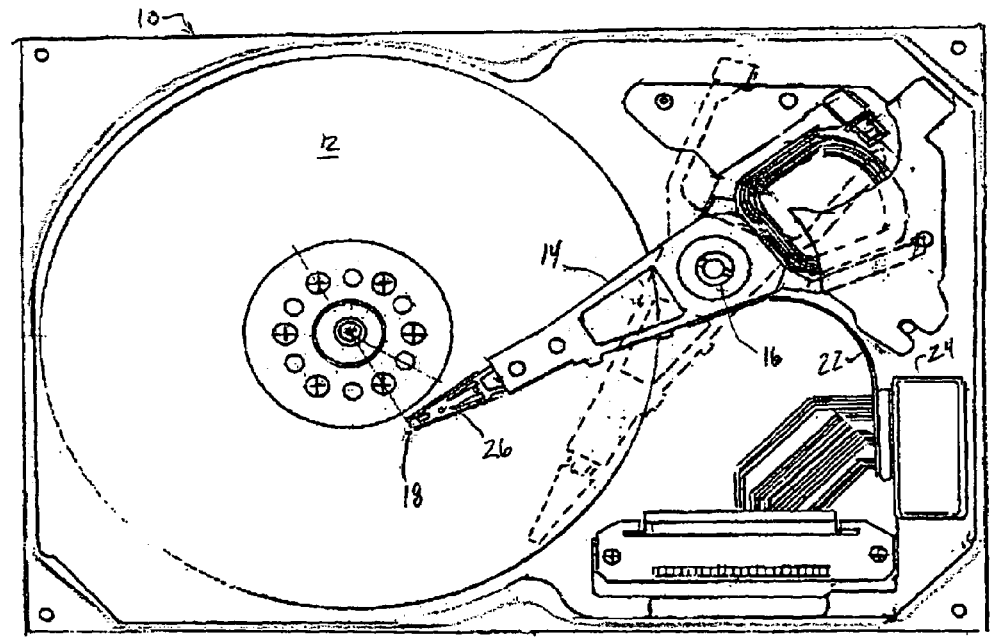
FIG. 1 is a plan view of a disk drive of the present invention.

Referring first to FIG. 1, the disk drive 2 is contained within a disk drive housing 10. The disk drive 2 includes one or more disks 12 for the storage of information, and an actuator arm 14 that is rotatable about a shaft 16. A slider 18 is disposed at the distal end of the actuator arm 14, and the read/write transducer or "head element" 20 is typically positioned at or near the trailing end of the slider 18. (See FIGS. 2, 3) The actuator arm 14 can rotate about shaft 16, thereby allowing head element 20 to access the disks 12 and read information from and write information to the disks 12. Information is transmitted to the head element 20 by way of a flexible circuit board 22.

When closed, the lid (not shown) of the disk drive 2 compresses a seal (not shown) which is positioned between the underside of the lid and the outer wall of the housing 10. The seal and a filter 24 within the disk drive 2 aid in maintaining an atmosphere within the disk drive 2 that is relatively free of corrosive materials. Additional or different filters may be added as needed.

Initial testing of a post-assembly disk drive results in exposure of the sensitive thin metal layers or films of the head element 20. Accordingly, upon subsequent opening of the disk drive housing 10 to access its interior, for example, to perform repairs or rework associated with the contents of the disk drive 2, the relatively corrosive free environment of the disk drive housing 10 is compromised, thereby allowing potentially corrosive materials within the atmosphere of the local environment to reach the interior contents within the disk drive 2, including the head element 20 and its exposed sensitive read/write surfaces. Therefore, to reduce possible corrosion of the head element 20, upon a reworking of the disk drive 2, the head element 20 is removed from the disk drive housing 10 and a protective coating is applied to the head element 20.

Figure 3:
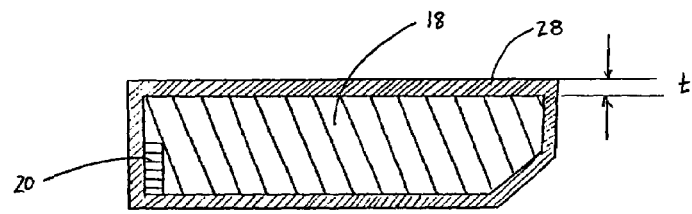
FIG. 3 is a side elevation view of a slider and head element with a protective coating applied.
Figure 2:
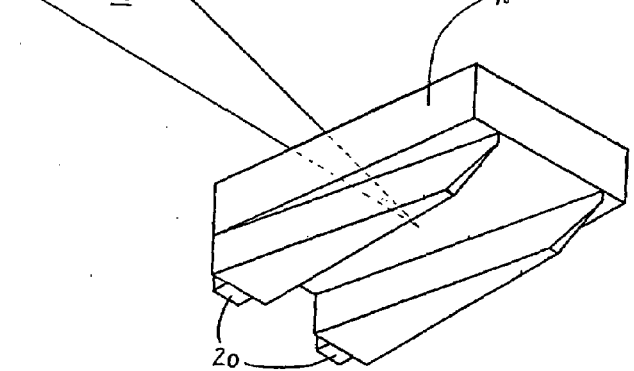
FIG. 2 is a bottom perspective view of a slider and head element.

Referring now to FIGS. 2 and 3, the head element 20 is relatively small and is typically located at one end of the slider 18, which in turn, is attached to actuator arm 14 by a suspension assembly or load beam 26. (See FIG. 1) The relatively small size of the head element 20 renders it physically difficult to apply a protective coating 28 to only the head element 20. Accordingly, given the relative difficulty in applying a protective coating 28 to only the head element 20, for purposes of ease of handling, it is preferable in the case of an assembled disk drive to remove the slider assembly 18 with the head element 20 attached thereto, and subsequently apply a protective coating 28 to both the head element 20 and slider 18, or in the case of assembling a new disk drive, apply a protective coating 28 to the HSA or head-gimbal assembly (HGA).

Figure 4:
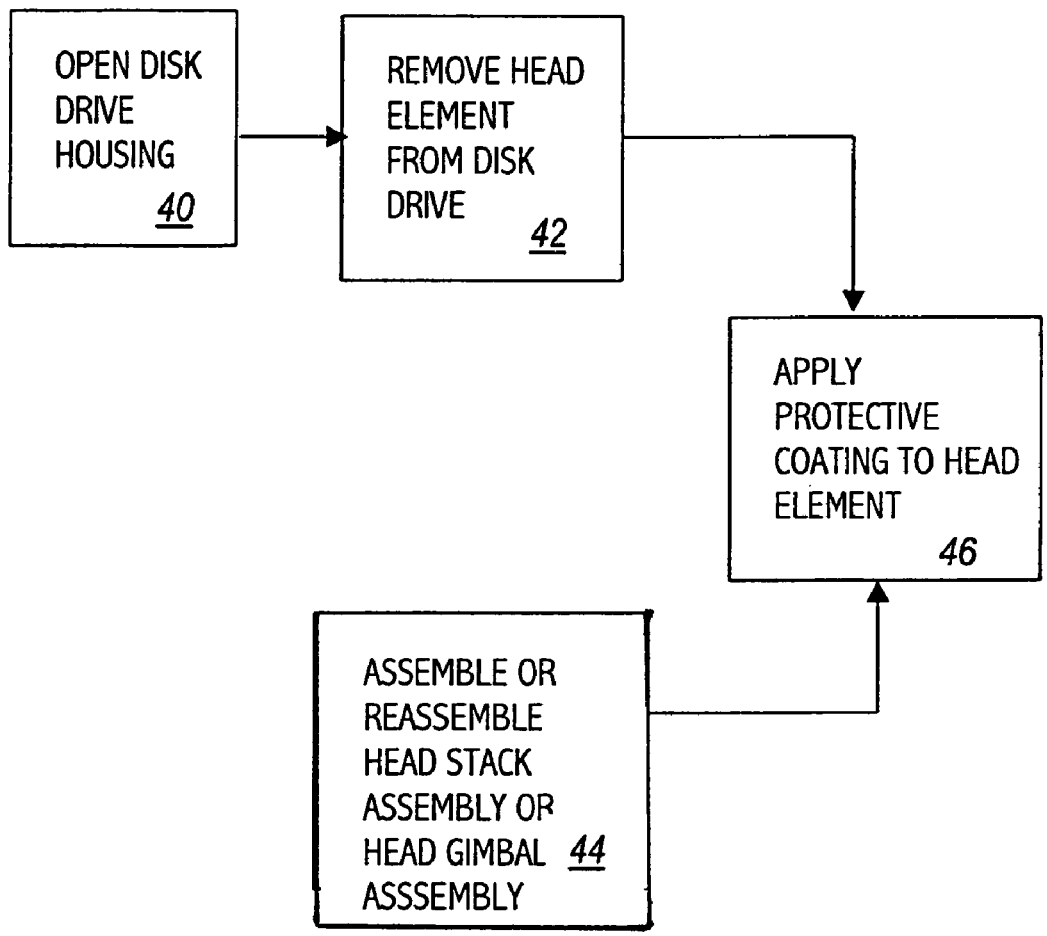
FIG. 4 is a flowchart depicting the basic steps of two methods of the invention.

FIG. 4 is a flow diagram which discloses the basic steps of performing two related methods of this invention, one relating to reworked disk drives and the other to new disk drives. First, in the case of an existing disk drive, the disk drive is opened at block 40, followed by removal of the head element 20 from the disk drive at block 42. In the case of a new disk drive, the slider and head element are formed into a subassembly, together with the suspension and, perhaps, the actuator arm, in block 44. In either case, a protective coating 28 is applied to the head element at block 46 using one of the above described processes, or perhaps other processes known to those skilled in the art. As a practical matter, the protective coating will not be applied solely to the head element 20, given the relatively small size of the components. Rather, the protective coating will be applied to the head-gimbal assembly (generally comprising the head, slider and suspension) or to the head-stack assembly (generally comprising the head, slider, suspension and actuator arm.)

The protective coating 28 should be relatively inert and have a relatively low surface energy or surface tension. It is preferred that the protective coating 28 be a fluorocarbon polymeric coating, such as, but not limited to, FC722 produced by 3M(®). The preferred thickness "t" of protective coating 28 will vary depending upon the polymeric material used and it will be appreciated by those skilled in the art upon reading this that any coating, if even a minimal thickness, such as a monolayer, is better than no coating at all. From experimentation, the inventors have learned that it is preferable to apply the protective coating in a thickness of greater than 50 angstroms, up to approximately 250 angstroms, if it is understood that the thickness of the coating will be subsequently reduced prior to assembly of the drive. A thick coating, greater than 50 angstroms, will provide adequate corrosion protection for the type of reworking contemplated herein.

The protective coating 28 may be deposited using a solvent-mediated deposition process; however, other processes exist to apply the protective coating 28, including placing the head element 20 and slider 18 in a vacuum chamber and using a vapor-mediated process. Precursor molecules in the vapor phase may be deposited by exposing the head element 20 and slider 18 to precursor gases and excitation, such as by heat, ultraviolet, infrared, or plasma energy to form the protective coating 28.

FIG. 4 is a flow diagram which discloses the basic steps of performing two related methods of this invention, one relating to reworked disk drives and the other to new or reworked HSAs or HGAs. First, in the case of an existing disk drive, the disk drive is opened at block 40, followed by removal of the head element 20 from the disk drive at block 42. In the case of a new or reworked HSA or HGA, the slider and head element are formed into a subassembly, together with the suspension and, perhaps, the actuator arm in block 44. In either case, a protective coating 28 is applied to the head element at block 46 using one of the above described processes, or perhaps other processes known to those skilled in the art.

Figure 5:
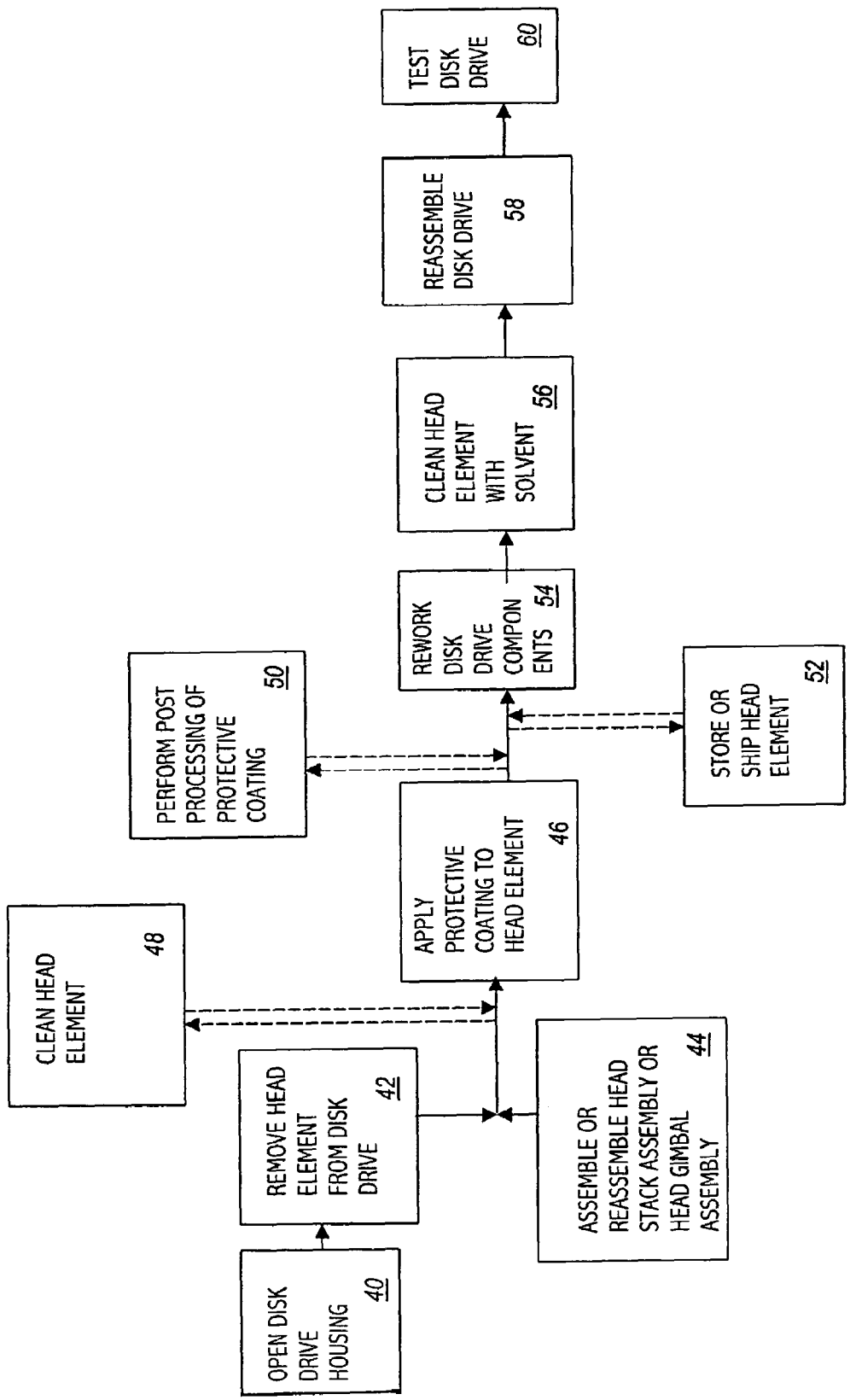
FIG. 5 is another flowchart depicting optional steps of two methods of the invention.

FIG. 5 is another flow diagram showing a more detailed process which may be conducted in accordance with the methods of this invention. Optional process steps are shown in dotted lines. One such optional step consists of cleaning the head element 20 at block 48. Preferably, this step is performed prior to the step of applying the protective coating 28 at block 46 and preventing trapping debris underneath the protective coating. Of course, the type of cleaning solutions that can be used will be apparent to those skilled in the art upon reading this disclosure.

Following the step of applying the protective coating at block 46, another optional step consists of performing post-processing of the protective coating at block 50. Post-processing is performed by exposing the deposited film to ultraviolet, infrared, plasma, or other forms of energy that cause the polymer coating to cross-link, thereby providing increased corrosion protection.

In addition to performing the optional step of post-processing the protective coating, it may also be necessary to ship and/or store the head elements. As an example, shipping may be necessary in order to transport the head elements or other interconnected components of the disk drive (HSA or HGA) to a vendor to perform rework. Alternately, the head elements may be removed and temporarily stored at the point of disassembly while other components of the disk drive are reworked. This optional step of storing or shipping the head element is shown at block 52. To perform this step, the coated heads are mounted on a shipping comb and placed within a protective container (not shown), such as is described in U.S. patent application Ser. No. 09/923,500 filed on Aug. 6, 2001 and incorporated herein by reference.

A further step consists of reworking the disk drive components at block 54. For this step, any necessary repairs to the drive components are performed after having previously applied the protective coating at block 46. Once the drive components have been reworked, or replacement parts have been obtained, and the drive is ready for reassembly, the head element will be cleaned at block 56 to reduce the thickness of the protective coating to less than 20 angstroms. When utilizing fluorocarbon polymers, it has been discovered that a non-aqueous solvent, such as hydrofluoroether, will reduce the thickness of the coatings to below 20 angstroms.

By removing at least a portion of the protective coating that was applied at block 46, the likelihood the coating will contribute to drive contamination is reduced. Also, a low energy surface remains on the head and other elements to reduce the accumulation of debris collecting on these elements. In this embodiment, the unremoved portion of the protective coating covering the head element is removed when the disk drive is later reassembled and operated, thereby causing the slider to contact the disk surface and the protective coating to be mechanically worn away. Reassembly occurs at block 58.

Finally, if desired, the reworked and reassembled disk drive may be tested at block 60 to assess whether the reworked disk drive is functioning properly. Provided the drive is functioning properly, the disk drive may be placed into the stream of commerce. Alternately, the disk drive may be re-opened a second time, and the basic rework steps of FIG. 4 repeated, with any further optional steps of FIG. 5 performed as may be necessary.

Of course, it is to be understood that the invention described herein applies to any head element that possesses exposed read/write elements, or other sensitive elements. While the above description and the drawings disclose and illustrate numerous alternative embodiments, one should understand, of course, that the invention is not limited to these embodiments. Those skilled in the art to which the invention pertains may make other modifications and other embodiments employing the principles of this invention, particularly upon considering the foregoing teachings. Therefore, by the appended claims, the applicant intends to cover any modifications and other embodiments as incorporate those features which constitute the essential features of this invention.

What is claimed is:

1. A method for reducing corrosion of a head element during the manufacture of a disk drive including rework operations, said head element being initially contained within the housing of said disk drive following assembly, said method comprising the steps of:
   opening said housing of said disk drive;
   removing said head element from said housing of said disk drive;
   applying a non-permanent protective coating to said head element; and
   storing said head element following the step of applying said non-permanent protective coating.

2. The method, as claimed in claim 1, further comprising the step of cleaning said head element prior to said step of applying a non-permanent protective coating.

3. The method, as claimed in claim 1, wherein said non-permanent protective coating is applied in a vacuum chamber.

4. The method, as claimed in claim 1, wherein said non-permanent protective coating is applied utilizing solvent-mediated deposition.

5. The method, as claimed in claim 1, wherein said non-permanent protective coating is applied utilizing vapor-mediated deposition.

6. The method, as claimed in claim 1, wherein said step of applying a non-permanent protective coating is performed by depositing precursor molecules in the vapor phase.

7. The method, as claimed in claim 1, wherein said non-permanent protective coating comprises a fluorocarbon polymer.

8. The method, as claimed in claim 1, wherein said non-permanent protective coating is a thickness of greater than 50 angstroms.

9. The method, as claimed in claim 1, further comprising the step of post-processing said non-permanent protective coating to enhance the corrosion protection of said head element.

10. The method, as claimed in claim 9, further comprising reworking at least a portion of the disk drive followed by the step of removing at least a portion of said non-permanent protective coating after said step of reworking said disk drive.

11. The method, as claimed in claim 10, further comprising the step of reassembling said disk drive after said step of removing at least said portion of said non-permanent protective coating.

12. The method, as claimed in claim 11, further comprising the step of testing said disk drive after said step of reassembling said disk drive.

13. The method, as claimed in claim 11, further comprising the step of removing at least an additional portion of said non-permanent protective coating after said step of reassembling the disk drive.

14. The method, as claimed in claim 13, further comprising the step of testing said disk drive.

15. The method, as claimed in claim 10, wherein said step of removing at least said portion of said non-permanent protective coating is performed utilizing a solvent.

16. The method, as claimed in claim 9, wherein said post-processing step is performed by exposing said non-permanent protective coating to a form of energy selected from the group consisting of infrared, ultraviolet, plasma, or radiant heat.

17. The method, as claimed in claim 1, further comprising the step of reworking at least one component of said disk drive.

18. The method, as claimed in claim 17, further comprising the step of removing at least a portion of said non-permanent protective coating from said head element after said step of reworking said disk drive.

19. The method, as claimed in claim 18, further comprising the step of reassembling said disk drive after said step of removing at least said portion of said non-permanent protective coating from said head element.

20. The method, as claimed in claim 19, further comprising the step of removing at least an additional portion of said non-permanent protective coating from said head element after said step of reassembling said disk drive.

21. The method, as claimed in claim 20, further comprising the step of testing said disk drive.

22. The method, as claimed in claim 18, wherein the step of removing at least a portion of said non-permanent protective coating comprises completely exposing said head element after said step of reworking at least a portion of said disk drive.

23. The method, as claimed in claim 22, further comprising the step of reassembling said disk drive after said step of removing at least said portion of said non-permanent protective coating completely exposing said head element.

24. The method, as claimed in claim 17, further comprising the combination step of simultaneously cleaning said head element while removing said non-permanent protective coating, after said step of reworking at least a portion of said disk drive.

25. The method, as claimed in claim 24, wherein said step of simultaneously cleaning said non-permanent head element while removing said protective coating, is performed using a non-aqueous solvent.

26. The method, as claimed in claim 17, further comprising the step of reassembling the disk drive followed by the step of removing at least said portion of said non-permanent protective coating.

27. The method, as claimed in claim 26, further comprising the step of testing said disk drive.

28. The method, as claimed in claim 1, wherein said non-permanent protective coating has a thickness comprising at least one monolayer.

29. The method, as claimed in claim 1, wherein said non-permanent protective coating has a thickness comprising at least 50 angstroms.

30. The method, as claimed in claim 1, wherein said non-permanent protective coating is applied having a thickness up to approximately 250 angstroms.

31. A method for shipping a head element removed from a disk drive during manufacture of said disk drive, said method comprising the steps of:
removing said head element from said disk drive;
applying a protective coating to said head element;
mounting said head element to a shipping comb;
placing said head element into a container; and,
transporting said container.

32. The method, as claimed in claim 31, further comprising the step of cleaning said head element prior to said step of applying a protective coating.

33. The method, as claimed in claim 31, wherein said step of applying said protective coating to said head element occurs following mounting said element to said shipping comb.

34. A method for storing a head element removed from a disk drive, said method comprising the steps of:
removing said head element from said disk drive;
applying a fluorocarbon polymer protective coating to said head element;
mounting said head element to a slipping comb; and
placing said head element in a storage container.

35. The method, as claimed in claim 34, further comprising the step of cleaning said head element prior to said step of applying said protective coating.

36. The method, as claimed in claim 34, wherein said step of applying said protective coating to said head element occurs following mounting said head element to said shipping comb.

37. A method for manufacturing a disk drive, comprising:
disassembling a portion of the disk drive;
removing a head element from the disk drive;
applying a temporary protective coating on said head element after disassembly wherein disassembly includes removal of the head element from the disk drive;
reworking a portion of the disk drive; and
removing at least a portion of said temporary protective coating after said step of reworking a portion of the disk drive.

38. The method of claim 37, further comprising mounting said head element on a shipping comb.

39. The method of claim 37, wherein applying said temporary protective coating on said head element comprises applying a polymeric fluorocarbon.

40. The method of claim 37, further comprising applying said temporary protective coating using a solvent-mediated deposition process.

41. The method of claim 40, further comprising post processing said temporary protective coating to enhance the corrosion protection of said protective coating.

42. The method of claim 41, further comprising exposing said temporary protective coating to an energy source selected from the group consisting of infrared, ultraviolet, plasma, or radiant heat.

43. The method of claim 37, further comprising applying said temporary protective coating using a vapor-mediated deposition process.

44. The method of claim 37, further comprising applying said temporary protective coating by depositing precursor molecules in the vapor phase.

45. The method of claim 37, wherein said temporary protective coating is applied at a thickness of greater than 50 angstroms.

46. The method of claim 45, further comprising exposing said temporary protective coating to a solvent.

47. The method of claim 37, wherein said temporary protective coating is applied at a thickness comprising at least one monolayer.

48. The method of claim 37, wherein said temporary protective coating is applied at a thickness comprising at least 50 angstroms.

49. The method of claim 37, wherein said temporary protective coating is applied at a thickness up to approximately 250 angstroms.

50. A method for reducing corrosion of a head element during the manufacture of a disk drive including rework operations, said head element being initially contained within the housing of said disk drive following assembly, said method comprising the steps of:
opening said housing of said disk drive;
removing said head element from said housing of said disk drive;
applying a protective coating to said head element;
reworking at least a portion of the disk drive; and
removing at least a portion of said protective coating after said step of reworking said disk drive.

51. The method, as claimed in claim 50, further comprising the step of reassembling said disk drive after said step of removing at least said portion of said protective coating.

52. The method, as claimed in claim 51, further comprising the step of removing at least an additional portion of said protective coating after said step of reassembling the disk drive.

53. The method, as claimed in claim 52, further comprising the step of testing said disk drive.

54. The method, as claimed in claim 50, further comprising the step of removing at least a portion of said protective coating from said head element after said step of reworking said disk drive.

55. The method, as claimed in claim 54, wherein the step of removing at least a portion of said protective coating comprises completely exposing said head element after said step of reworking at least a portion of said disk drive.

56. The method, as claimed in claim 54, further comprising the step of testing said disk drive after said step of reassembling said disk drive.

57. The method, as claimed in claim 50, further comprising the step of post-processing said protective coating to enhance the corrosion protection of said head element.

58. The method, as claimed in claim 57, wherein said post-processing step is performed by exposing said protective coating to a form of energy selected from the group consisting of infrared, ultraviolet, plasma, or radiant heat.

59. The method, as claimed in claim 50, wherein said step of removing at least said portion of said protective coating is performed utilizing a solvent.

60. The method, as claimed in claim 50, wherein said protective coating has a thickness comprising at least one monolayer.

61. The method, as claimed in claim 50, wherein said protective coating has a thickness comprising at least 50 angstroms.

62. The method, as claimed in claim 50, wherein said protective coating is applied having a thickness up to approximately 250 angstroms.

63. The method as claimed in claim 50, wherein said protective coating comprises a fluorocarbon polymer.

64. A method for reducing corrosion of a head element during the manufacture of a disk drive including rework operations, said head element being initially contained within the housing of said disk drive following assembly, said method comprising the steps of:
  opening said housing of said disk drive;
  removing said head element from said housing of said disk drive;
  applying a non-permanent protective coating to said head element;
  reworking at least one component of said disk drive, and reassembling the disk drive followed by the step of removing at least a portion of said non-permanent protective coating.

65. The method, as claimed in claim 64, further comprising the step of testing said disk drive.

66. The method, as claimed in claim 64, wherein the step of removing at least a portion of said non-permanent protective coating comprises completely exposing said head element after said step of reworking at least a portion of said disk drive.

67. The method, as claimed in claim 64, wherein said non-permanent protective coating comprises a fluorocarbon polymer.

68. The method, as claimed in claim 64, further comprising the step of storing said head element following said step of applying said non-permanent protective coating.

69. The method, as claimed in claim 64, further comprising the step of post-processing said non-permanent protective coating to enhance the corrosion protection of said head element.

* * * * *

UNITED STATES PATENT AND TRADEMARK OFFICE
CERTIFICATE OF CORRECTION

PATENT NO. : 6,954,978 B1
DATED : October 18, 2005
INVENTOR(S) : Crowder et al.

It is certified that error appears in the above-identified patent and that said Letters Patent is hereby corrected as shown below:

Column 9,
Line 30, delete "slipping" and replace with -- shipping --.

Signed and Sealed this

Twenty-seventh Day of December, 2005

JON W. DUDAS
*Director of the United States Patent and Trademark Office*